T. H. HOSKINGS.
Seed-Planter.
No. 3,413.
Patented Jan. 20, 1844.
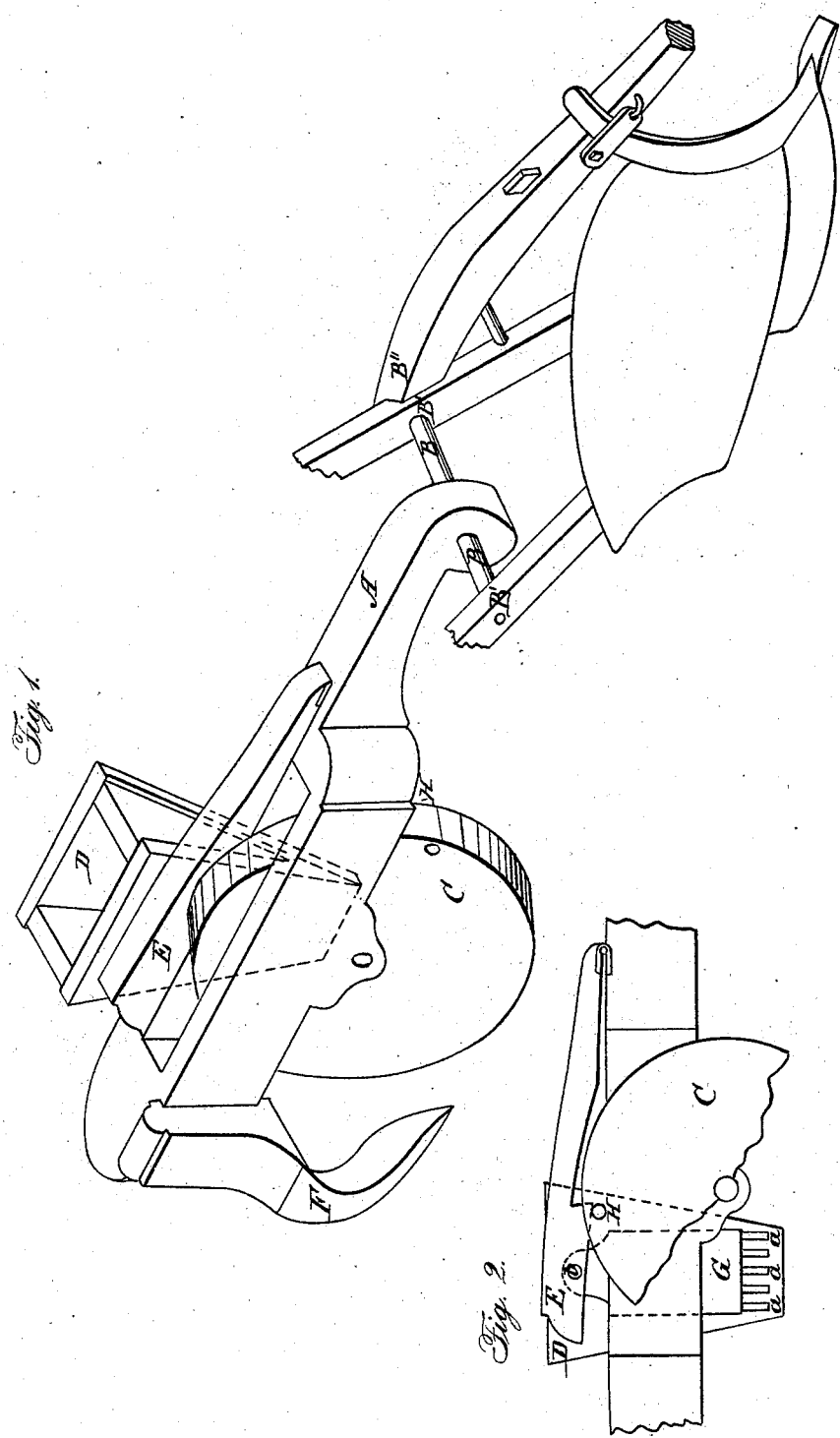

UNITED STATES PATENT OFFICE.

THOS. H. HOSKINGS, OF CRAWFORDSVILLE, INDIANA.

IMPROVEMENT IN CORN-PLANTERS.

Specification forming part of Letters Patent No. 3,413, dated January 20, 1844.

*To all whom it may concern:*

Be it known that I, THOS. H. HOSKINGS, of Crawfordsville, in the county of Montgomery and State of Indiana, have invented a new and useful Machine for Planting Corn, which machine is to be used in combination with the common furrow-plow; and I do hereby declare that the following is a full and exact description thereof.

My machine for planting corn is to be so formed as that it may be attached to the common plow, for which purpose it has a projecting arm extending forward, through the end of which a joint pin or bolt passes, by which it is connected to the plow in such manner as to keep it in its proper position. The machine has a single wheel, which runs in the furrow made by the plow, and on one side of this wheel there is a hopper for containing the corn. A pin projecting on one face of this wheel is brought into contact with a lever, which raises a slide on one side of the hopper and allows the grain to drop out once in every revolution of the wheel. The distance of the hills from each other will be determined, therefore, by the diameter of this wheel. At the rear end of the machine there is a scraper or coverer, by which a portion of the earth thrown up by the plow is turned over into the furrow and made to cover the grain which has been planted. The whole length of the machine is such as to be contained within the length of the handles of the plow, leaving room also for the steps of the plowman.

In the accompanying drawings, Figure 1 is a perspective representation of my machine. A is the arm-projection out in front, and having a pin or bolt, B B, passing through it and through holes at B' B' in the handles of the plow, near to where they join the beam B'' or the body of the plow, or through eyes or staples attached thereto for that purpose. The bolt or pin B will preserve the machine in an upright position, and will allow the wheel to rise and fall freely in passing over the ground. C is the wheel, and D the hopper for containing the seed corn. E is a lever with which a pin, H, projecting from the face of the wheel C, is to be brought into contact, so as to raise it and a slide to which it is attached to such height as shall allow the corn to fall from the lower end of the hopper, from which it passes into the furrow made by the plow. F is a scraper or coverer, which stands immediately behind the wheel C in such a position as to return a portion of the earth turned up by the plow into the furrow, and thus to cover the corn which has been dropped.

Fig. 2 shows a part of the face of the hopper which is toward the wheel C. At the bottom of the hopper there are openings $a\ a\ a$ to allow the corn to pass out. G is a sliding shutter, which, when down, covers these openings, and which is jointed at its upper end to the lever. H is the plan of the pin which by the revolution of the wheel C raises the shutter G, which is jointed to it by a pin at $b$.

Having thus fully described the manner in which I construct my planting-machine and combine the same with the common plow, what I claim as new, and desire to secure by Letters Patent, is—

The manner in which I have arranged the respective parts of said planting-machine so as to connect it with the common plow by means of a joint-pin, allowing it to be attached to such plow between the handles and to be detached at pleasure, substantially in the manner and for the purpose herein set forth.

THOMAS H. HOSKINGS.

Witnesses:
THOS. P. JONES,
EDWIN L. BRUNDAGE.